United States Patent
Nygard et al.

(10) Patent No.: US 6,313,561 B1
(45) Date of Patent: Nov. 6, 2001

(54) DYNAMIC BLOCKING RESTRAINT OF A ROTOR FIELD WINDING CONTAINED BY A NON-METALLIC STRUCTURAL ROTOR ENCLOSURE

(75) Inventors: Robert J. Nygard; Christopher A. Kaminski; Yu Wang, all of Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,861

(22) Filed: Jan. 26, 2000

(51) Int. Cl.⁷ ....................................... H02K 1/22
(52) U.S. Cl. .................. 310/261; 310/216; 310/217; 310/218
(58) Field of Search .................. 310/261, 214, 310/215, 216, 217, 218, 262

(56) References Cited

U.S. PATENT DOCUMENTS

| | | | |
|---|---|---|---|
| 3,780,325 | * 12/1973 | Frankenhauser | 310/214 |
| 5,053,663 | * 10/1991 | Boer et al. | 310/91 |
| 5,078,628 | * 1/1992 | Garis, Jr. | 440/6 |
| 5,325,008 | * 6/1994 | Grant | 310/214 |
| 5,498,916 | * 3/1996 | Lindner et al. | 310/214 |
| 5,854,525 | * 12/1998 | Pommelet | 310/214 |

* cited by examiner

*Primary Examiner*—Nestor Ramirez
*Assistant Examiner*—Thanh Lam
(74) *Attorney, Agent, or Firm*—Nixon & Vanderhye P.C.

(57) ABSTRACT

The conventional bar by bar assembly of a generator rotor can be replaced with a solid rotor having parallel slots milled into a rotor forging so that containment components can be replaced with a simplified enclosure. A dynamic blocking restraint assembly is beneficial to control winding position, to prevent load dissymmetries against the winding enclosure, and to provide sufficient preload to obtain predictable behavior in all expected modes of operation. The blocking assembly includes a sandwich construction of a first support block, at least one spring, additional wedge-shaped spacers in the case of multiple springs, and a second support block disposed in a symmetrical arrangement substantially aligned with the quadrature axis of the rotor. The assembly serves to provide circumferential restraint and to match the structural hoop stiffness of the winding enclosure. The construction of components can be configured to accommodate any desired degree of preloading.

15 Claims, 4 Drawing Sheets

DYNAMIC BLOCKING RESTRAINT OF A ROTOR FIELD WINDING CONTAINED BY A NON-METALLIC STRUCTURAL ROTOR ENCLOSURE

BACKGROUND OF THE INVENTION

The present invention relates to generators and, more particularly, to a blocking restraint for rotor field windings in an enclosure for a generator rotor.

In a conventional generator having a rotor and a stator, the rotor is provided with field windings that excite the generator while receiving a current from an exciting current source. The stator is provided with armature windings from which electrical power is output. Typical rotor construction requires that a field winding be assembled bar by bar, into radial slots milled into a rotor forging. Containment of the rotor field windings is typically achieved using rotor wedges, rotor teeth and retaining rings.

It would be desirable to replace the bar by bar assembly with a solid rotor having parallel slots milled into a rotor forging. With this structure, the containment components could be replaced with a simplified enclosure. Filament wound enclosure rings are more elastic and allow greater freedom of motion to the winding. In this context, however, it is beneficial to control winding position, to prevent load dissymmetries against the winding enclosure, and to provide sufficient preload to obtain predictable behavior in all expected modes of operation.

BRIEF SUMMARY OF THE INVENTION

In an exemplary embodiment of the invention, a dynamic blocking restraint assembly is provided for field windings of a generator rotor winding module contained by an enclosure. The dynamic blocking restraint assembly includes a first support block engageable with a rotor field winding, a first spring disposed engaging the first support block, a second support block engageable with an adjacent rotor field winding, a second spring disposed engaging the second support block, and a wedge disposed between the first spring and the second spring. The assembly is preferably constructed in a sandwich for insertion between the rotor field winding and the adjacent rotor field winding in an order of the first support block, the first spring, the wedge, the second spring, and the second support block. At least one additional wedge may be provided, and at least one, corresponding, additional spring may be disposed between the wedge and the additional wedge. The first and second springs are preferably corrugated with the corrugations oriented at an angle relative to edges of the springs. Structural characteristics of the first and second springs may be selected to counterbalance circumferential forces exerted on the winding module.

In another exemplary embodiment of the invention, a generator rotor includes a multi-pole magnetic core and a plurality of core assemblies, one for each pole. The core assemblies define a winding module having a plurality of field windings. The rotor also includes an enclosure housing the core and the core assemblies, and the dynamic blocking restraint assembly of the invention disposed between adjacent first and second field windings. The wedge of the dynamic blocking assembly is preferably substantially aligned with each quadrature axis of the rotor.

In still another exemplary embodiment of the invention, the dynamic blocking restraint assembly includes a first support block and a second support block engageable with a rotor field winding and an adjacent rotor field winding, respectively, and a spring interposed between the first and second support blocks.

DETAILED DESCRIPTION OF THE INVENTION

Figure 1:
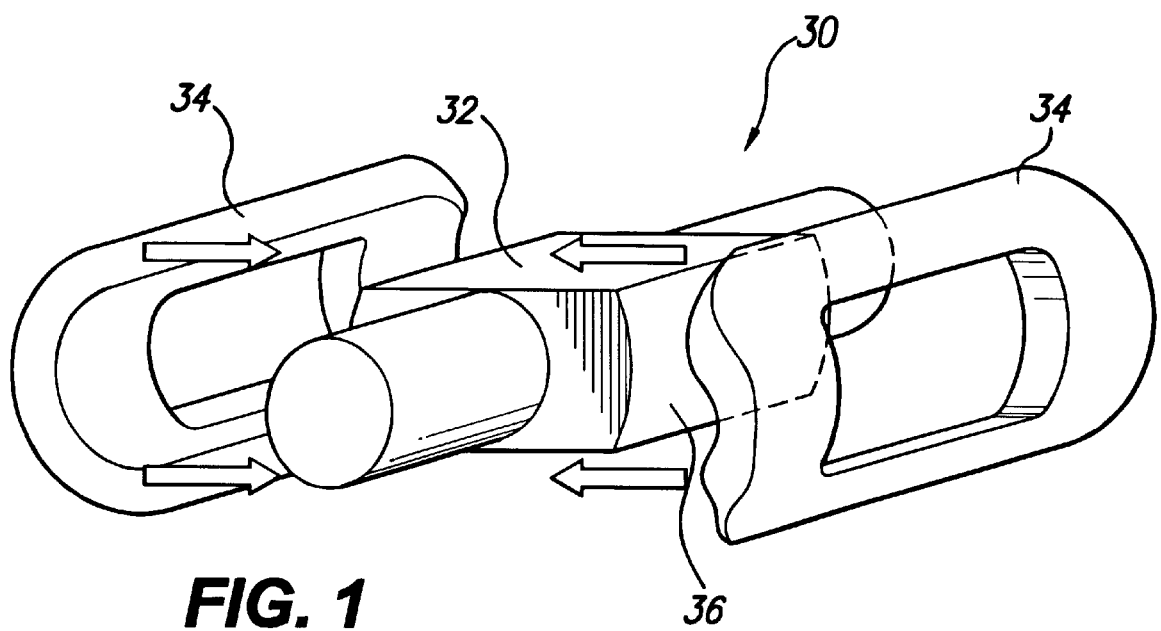
FIG. 1 is an assembly drawing of a generator rotor.
Figure 2:
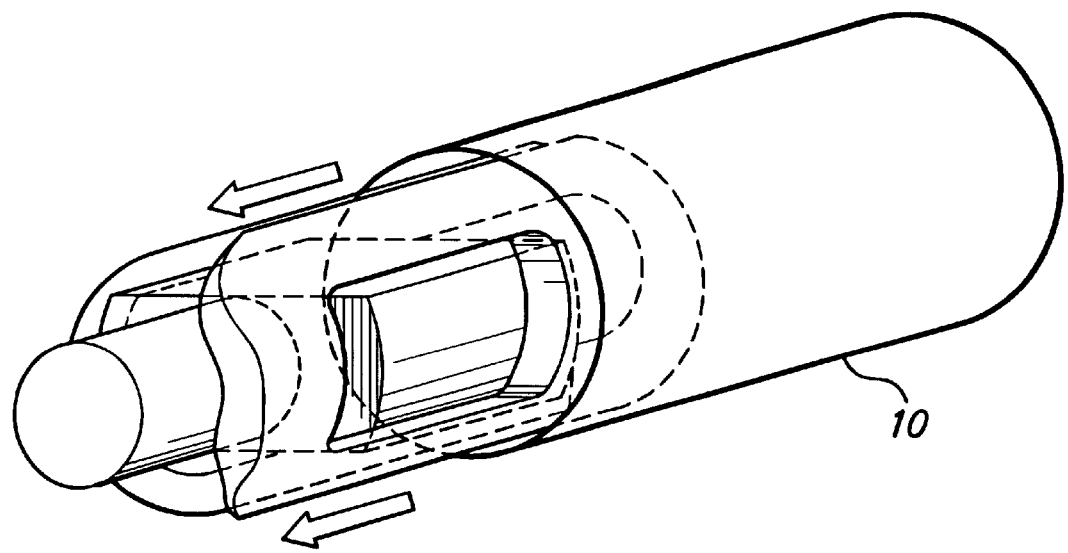
FIG. 2 is an assembly drawing of a generator rotor including an enclosure.

With reference to FIGS. 1 and 2, a generator rotor 30 includes a multi-pole magnetic core 32 (two-pole core shown) and a plurality of winding assemblies 34, one for each pole, and corresponding pole faces 36. The construction and materials of the magnetic core 32 and winding assemblies 34 are known, and details thereof will not be further provided.

Figure 3:
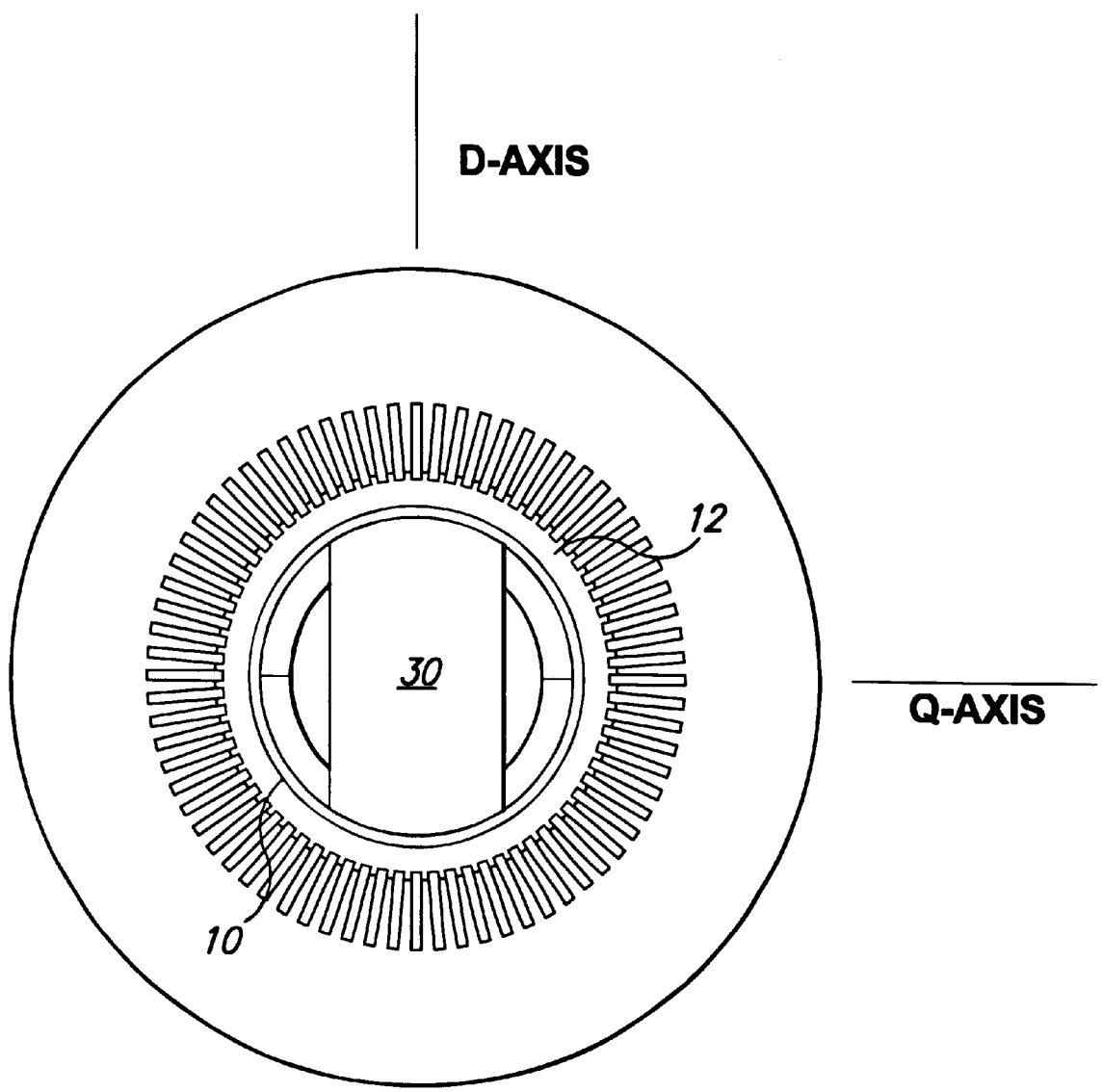
FIG. 3 is a schematic illustration of a generator rotor and stator and the enclosure of the present invention.

After the winding assemblies 34 are slid over the parallel sided forging of the two-pole magnetic core 32, an enclosure 10 is slid over the assembly. The enclosure 10 is preferably constructed from a low density composite material, such as a carbon fiber—glass fiber composite, and is configured to provide a means for discharging winding ventilation gas to a generator air gap 12 (see FIG. 3). The composite material is preferred because of its high strength to weight ratio. Other materials may also be suitable as would be apparent to those of ordinary skill in the art, and the invention is not meant to be particularly limited to the disclosed example.

Figure 4:
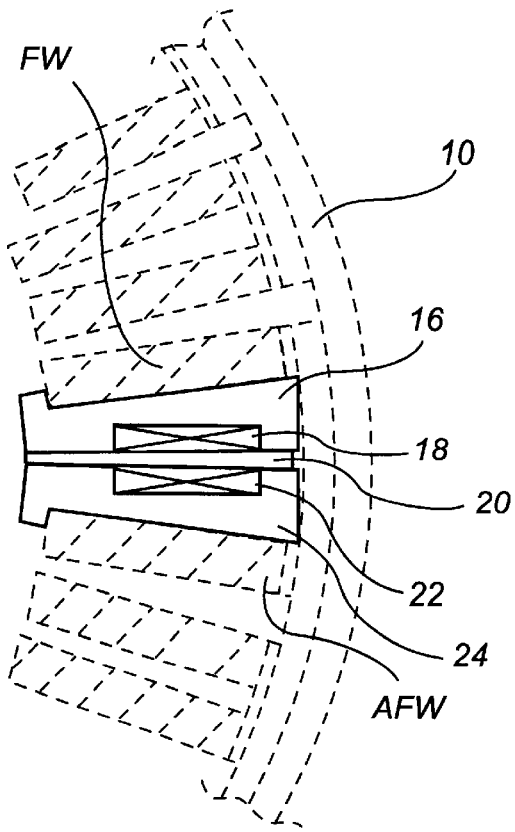
FIG. 4 is a cross-sectional view of a generator including the blocking restraint of the present invention.
Figure 5:
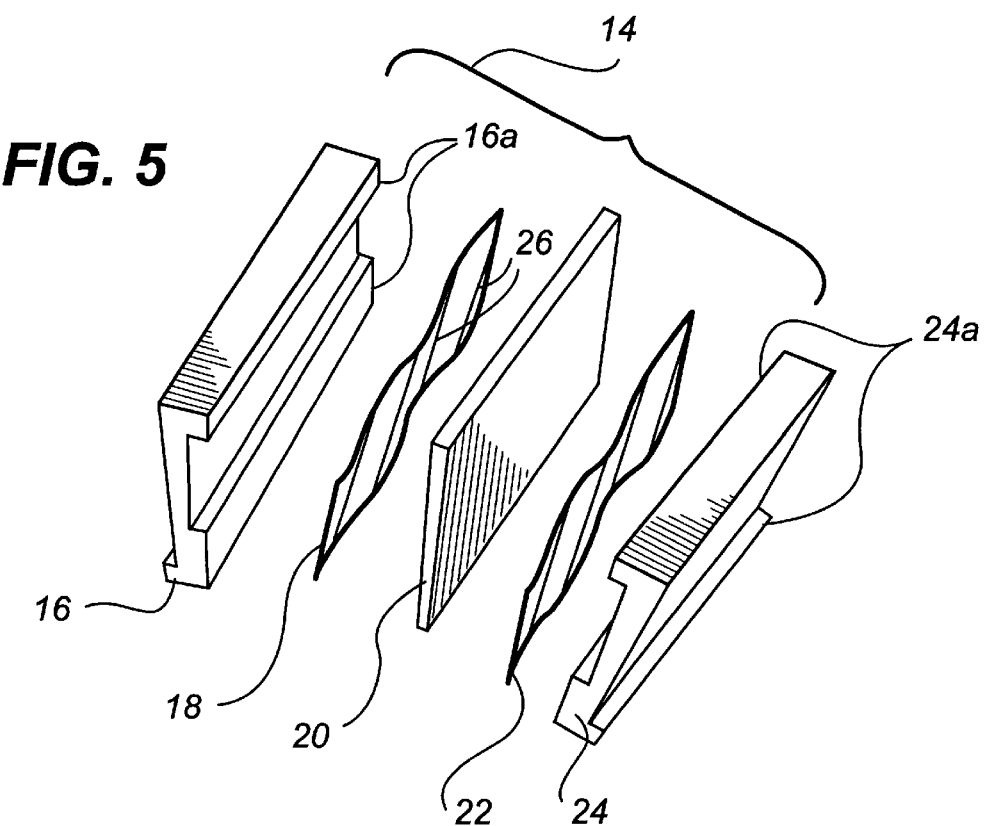
FIG. 5 illustrates the components of the dynamic blocking restraint assembly.

With reference to FIGS. 4 and 5, a dynamic blocking assembly 14 is a sandwich of components symmetrically arranged along the quadrature axis Q of the rotor assembly. The sandwich of components is inserted between field winding blocks on either side of the quadrature axis Q to provide circumferential restraint and to match the structural hoop stiffness of the winding enclosure. That is, as the enclosure 10, defined by hoops or rings, stretches under load, the passive components radially restrained by the enclosure move radially outward and thus apart from one another. The blocking restraint 14 inserted at the quadrature axis Q serves to press the components together against the sides of the pole faces 36. Matching the stiffness of the enclosure hoops is desirable to the extent that the difference in stiffness in the rotor body between the direct axis D and the quadrature axis Q can be minimized.

FIG. 5 illustrates the components of the blocking restraint assembly. The assembly 14 includes a first support block 16 engageable with a rotor field winding FW, a first spring 18 engaging the first support block 16, a wedge 20 disposed between the first spring 18 and a second spring 22, and finally a second support block 24 engageable with an adjacent field winding AFW. As noted, these components form a symmetrically arranged sandwich with the wedge 20 being formed substantially aligned with the quadrature axis Q.

With continued reference to FIG. 5, the first and second support blocks 16, 24 preferably include alignment ridges 16a, 24a, which serve to secure the support blocks 16, 24 in place in engagement with the respective field windings and to secure the springs 18, 22. The ridges 16a, 24a also serve to align the support blocks 16, 24 during insertion of the assembly.

The springs 18, 22 are provided with particular structural characteristics, such as material, thickness, running speed compression, and the like, to counterbalance circumferential forces exerted on the winding module at rotor speed. As shown in FIGS. 4 and 5, the springs 18, 22 may be linear or non-linear and preferably formed into a corrugated or curved shape and fabricated from a high strength composite material or a high strength material such as steel, with corrugations 26 oriented at a slanted angle relative to edges of the springs (see FIG. 5). Additionally, the springs 18, 22 in the restraint assembly can be utilized as individual pieces or in multiple layers, depending upon the degree of preloading desired.

Figure 6:
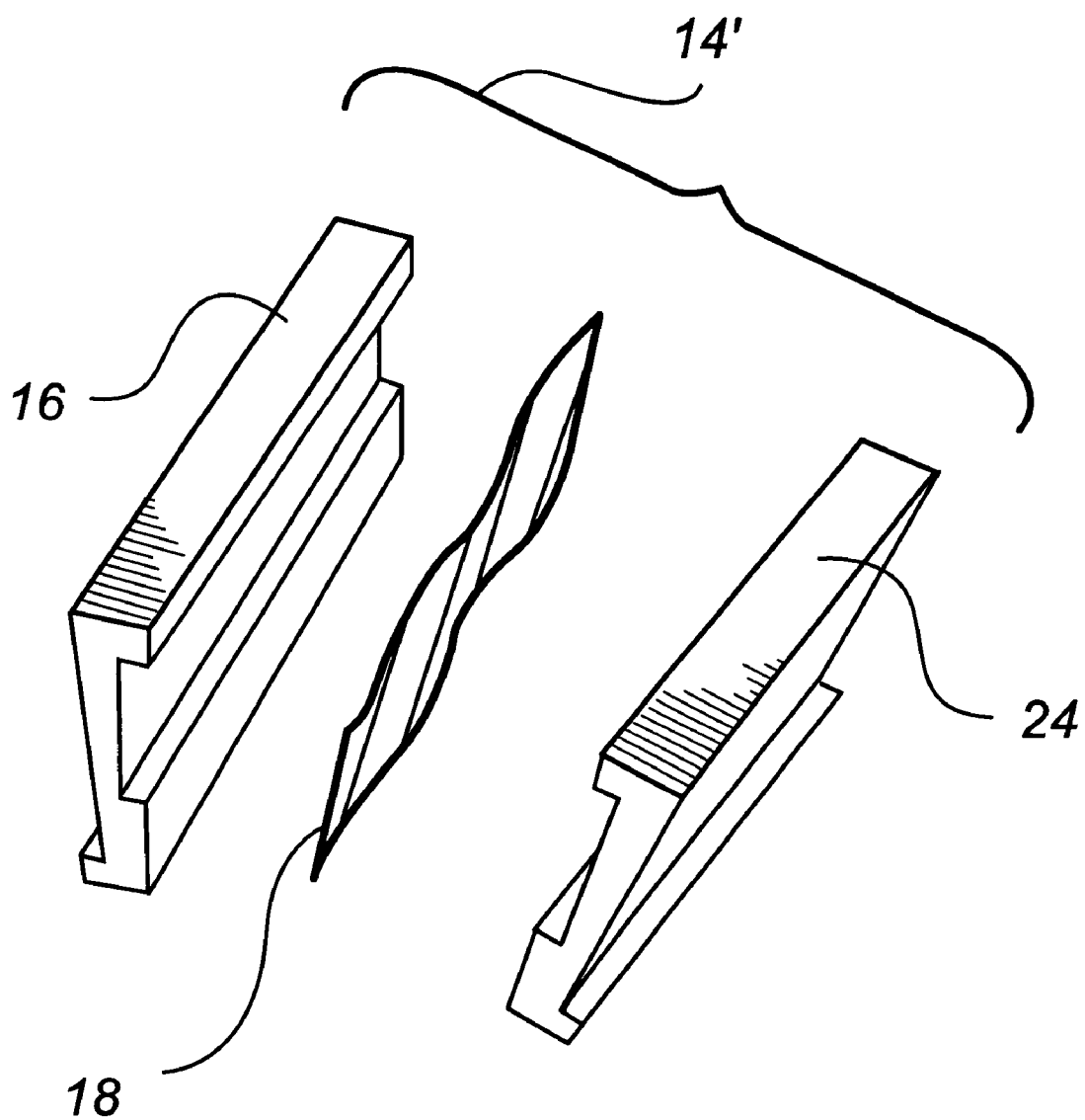
FIG. 6 illustrates an alternative construction of the dynamic blocking restraint assembly.

In an alternative arrangement, the blocking restraint assembly may include at least one additional wedge 20 and at least one, corresponding, additional spring 18, 22 disposed between the wedges. In this arrangement, to maintain symmetry of the assembly, the additional spring, in the case of one additional spring and one additional wedge, is substantially aligned with the quadrature axis Q. In a simplified alternative as shown in FIG. 6, the blocking restraint assembly 14' may include the support blocks 16, 24 with a single interposed spring 18. In this context, the spring 18 will likely have a larger amplitude of corrugation than in the previously described embodiments.

The dynamic blocking restraint assembly of the invention is thus readily adaptable and easily constructed to accommodate desired blocking of rotor field windings contained in a non-metallic rotor enclosure. The assembly serves to control winding position, prevent load dissymmetries against the winding enclosure, and provide sufficient preload to obtain predictable behavior in all expected modes of operation.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A dynamic blocking restraint assembly for field windings of a generator rotor winding module contained by an enclosure, the dynamic blocking restraint assembly comprising:
    a first support block engageable with a rotor field winding;
    a first spring disposed engaging the first support block;
    a second support block engageable with an adjacent rotor field winding;
    a second spring disposed engaging the second support block; and
    a wedge disposed between the first spring and the second spring.

2. A dynamic blocking restraint assembly according to claim 1, wherein the assembly is constructed in a sandwich for insertion between the rotor field winding and the adjacent rotor field winding in an order of the first support block, the first spring, the wedge, the second spring, and the second support block.

3. A dynamic blocking restraint assembly according to claim 2, further comprising at least one additional wedge and a corresponding at least one additional spring disposed between the wedge and the additional wedge.

4. A dynamic blocking restraint assembly according to claim 1, wherein the first and second springs are corrugated.

5. A dynamic blocking restraint assembly according to claim 4, wherein corrugations of the corrugated springs are oriented at an angle relative to edges of the springs.

6. A dynamic blocking restraint assembly according to claim 1, wherein structural characteristics of the first and second springs are selected to counterbalance circumferential forces exerted on the winding module.

7. A dynamic blocking restraint assembly according to claim 1, wherein the first and second support blocks each comprises at least one ridge for positioning and securing the assembly.

8. A generator rotor comprising:
    a multi-pole magnetic core and a plurality of core assemblies, one for each pole, the core assemblies defining a winding module having a plurality of field windings;
    an enclosure housing the core and the core assemblies; and
    a dynamic blocking restraint assembly disposed between adjacent first and second field windings, the dynamic blocking restraint assembly comprising:
        a first support block engaging the first field winding,
        a first spring disposed engaging the first support block,
        a second support block engaging the second field winding,
        a second spring disposed engaging the second support block, and
        a wedge disposed between the first spring and the second spring.

9. A generator rotor according to claim 8, wherein the dynamic blocking assembly is constructed in a sandwich for insertion between first and second field windings in an order of the first support block, the first spring, the wedge, the second spring, and the second support block.

10. A generator rotor according to claim 9, wherein the wedge of the dynamic blocking assembly is substantially aligned with a quadrature axis of the rotor.

11. A generator rotor according to claim 9, wherein the dynamic blocking assembly further comprises at least one additional wedge and a corresponding at least one additional spring disposed between the wedge and the additional wedge.

12. A generator rotor according to claim 8, wherein the first and second springs are corrugated.

13. A generator rotor according to claim 12, wherein corrugations of the corrugated springs are oriented at an angle relative to edges of the springs.

14. A generator rotor according to claim 8, wherein structural characteristics of the first and second springs are selected to counterbalance circumferential forces exerted on the winding module.

15. A generator rotor according to claim 8, wherein the first and second support blocks each comprises at least one ridge for positioning and securing the assembly.

\* \* \* \* \*